Patented Dec. 31, 1940

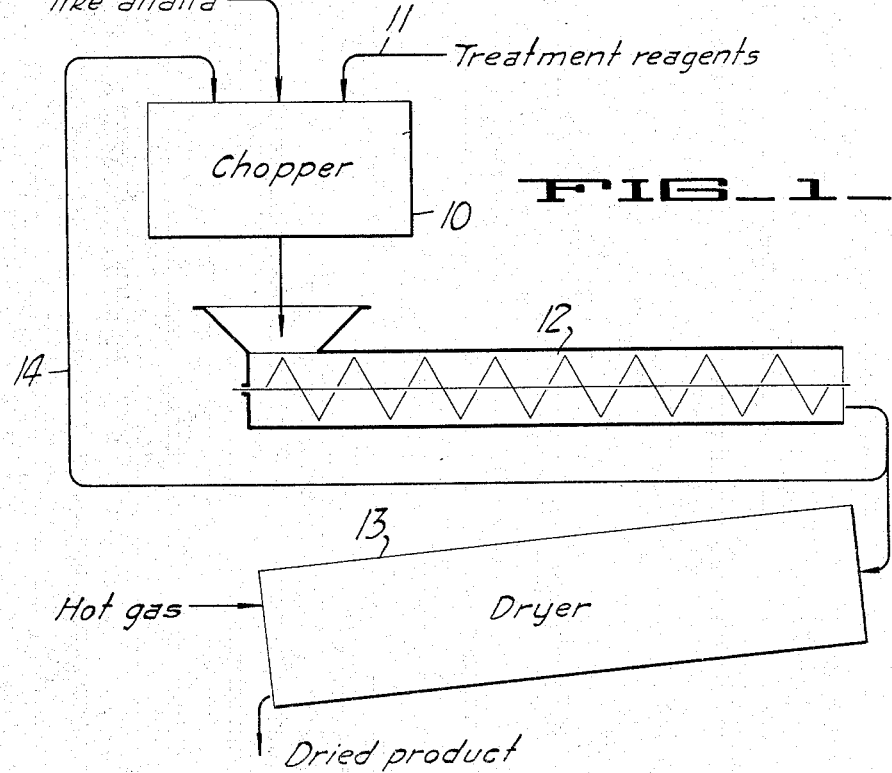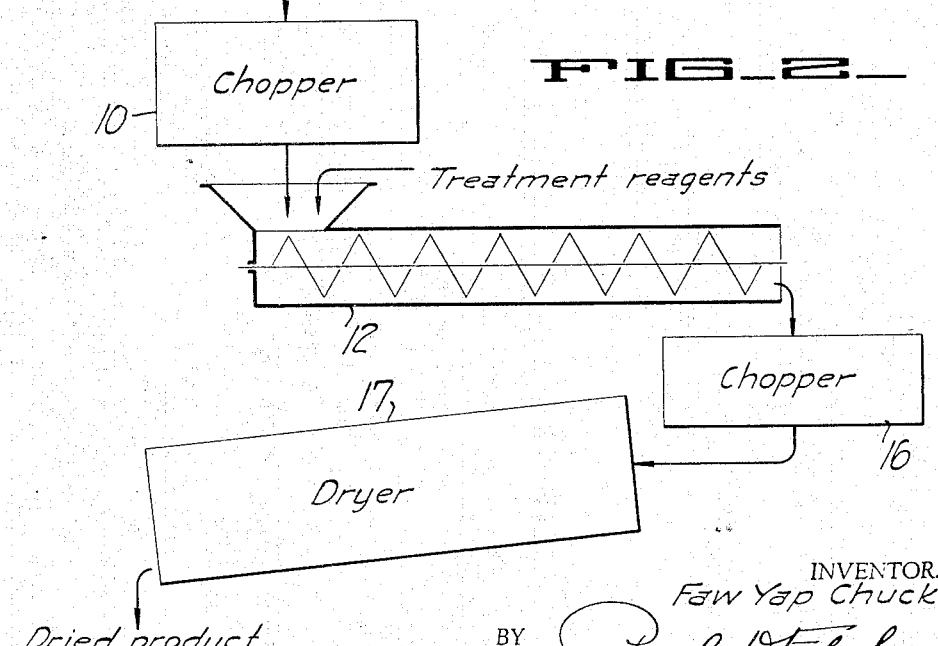

2,227,246

UNITED STATES PATENT OFFICE 2,227,246

DEHYDRATING PROCESS

Faw Yap Chuck, San Francisco, Calif.

Application January 17, 1938, Serial No. 185,420

15 Claims. (Cl. 99—154)

This invention relates generally to processes for the dehydration or drying of fresh leafy vegetable materials, like alfalfa or spinach, and to products resulting from such processes.

In the past the drying of fresh vegetables like alfalfa or spinach, has been subject to two principal disadvantages. In the first place such materials when chopped or comminuted, are difficult to dry by ordinary methods, because the chopped material tends to agglomerate together, thus precluding efficient contact with the drying gas. The second and more serious disadvantage has been that the dehydrated product produced deteriorates rapidly with respect to carotinoid and vitamin content, both during and after processing. Loss of carotene and vitamin content is accompanied by a rapid loss of color, so that within a comparatively short time the material loses freshness and its original vitamin and carotene content, particularly if exposed to the light.

It is an object of the present invention to provide a dehydration process which will facilitate the mechanics of removing moisture from the material, and which will also result in a stabilized product, which will keep for long periods of time without serious deterioration in carotinoid and vitamin content.

It is a further object of the invention to provide a process making possible a stabilized dehydrated product of high vitamin and carotinoid value, which will retain its green color for a relatively long period of time, and which when stored will not be subject to mold formation or like spoilage.

Another object is to provide a stable dehydrated vegetable product which will retain its carotinoid and vitamin potency over long periods of storage and which will afford a superior stock feed.

Additional objects of the invention will appear from the following description in which the preferred embodiment of the invention has been set forth in detail in conjunction with the accompanying drawing.

Referring to the drawing:

Figs. 1 and 2 are flow sheets illustrating two suitable procedures for carrying out the present process.

The present process is characterized by addition of small amounts of reagents like lime and calcium chloride, to the fresh material being treated, in order to neutralize plant acids, and to cause a hardening of the plant fibre. It is also preferable to introduce small amounts of a reagent like tannic acid or a related tannin compound, in order to inhibit enzymic activity. Addition of a further reagent like calcium lactate is desirable in order to afford a buffer medium tending to retain the final product in slightly acid condition. Addition of a preservative like benzoic acid, is also desirable. Drying can be carried out by conventional ways, but preferably involves continual agitation of the material in comminuted condition, while the material is being contacted with the drying gas.

Referring first to the flow sheet of Fig. 1, fresh leafy vegetable material, such as alfalfa, is shown being supplied to a suitable mechanical chopper 10. Line 11 indicates introduction of small amounts of treatment reagents into the chopper 10, to intermix with the alfalfa. These treatment reagents can conveniently be in the form of a dry powdered mix. The material being discharged from the chopper 10 is shown being delivered by conveyor 12, to the drum dryer 13. Further intermixture occurs in the conveyor 12, and a part of the material from this point can be returned to the chopper 10, to effect a final chopping, as indicated by line 14. The drying gas supplied to the dryer can be heated carbon dioxide, in order to minimize oxidation and to convert any hydroxide present (such as calcium hydroxide) to carbonate.

The process represented by Fig. 2 is similar to Fig. 1, except that two choppers are employed. Thus chopper 10 is shown delivering material to the conveyor and mixer 12, which in turn delivers the material to the second chopper 16, for fine chopping. The powdered reagents can be pneumatically blown into the material leaving chopper 10, before this material is introduced into the second chopper 16.

Best results have been secured by using a dry powdered mix of compounds, including slaked lime, calcium chloride, calcium carbonate, tannic acid, calcium lactate and benzoic acid. Suitable proportions for such reagents are as follows:

| | Pounds |
|---|---|
| Slaked lime | 1000 |
| Calcium chloride | 500 |
| Calcium carbonate | 1000 |
| Tannic acid | 100 |
| Calcium lactate | 500 |
| Benzoic acid | 50 |

About 12 pounds of the above mix will suffice for the treatment of one ton of wet hay or alfalfa.

As previously mentioned the function of the lime is to react with and substantially neutralize plant acid. This is of significance in connection with the preservation of carotinoids, because carotinoids are unstable in acid, but are comparatively stable and are preserved under slightly acid or substantially neutral condition. Furthermore treatment with lime serves to harden the plant fibre, presumably because of the action of the hydroxide upon plant protein. In any event the lime exerts a noticeable stiffening action upon leafy fibre, and this in turn tends to prevent agglomeration of the comminuted material, during the final drying operation. After treatment with lime, the material readily segregates itself in a drum dryer, so that there is no packing and no agglomeration, but instead there is present a mass of material which readily falls apart into its component fragments, thus facilitating intimate contact of the individual particles with the drying gas.

Fair results have been secured by using slaked lime alone as a treatment reagent, slightly less than that required to combine with plant acid. In such instances the excess lime can be largely, if not entirely converted to calcium carbonate, in the final drying operation, by the use of hot carbon dioxide as a drying gas. Addition of other reagents is desirable however, for reasons which will be presently explained in detail. Use of a considerable amount of calcium carbonate in place of a part of the slaked lime, makes it possible to reduce the amount of lime employed. Such use of calcium carbonate minimizes any unreacted lime to be converted to calcium carbonate by the final drying operation. Calcium carbonate is a mild neutralizing agent, which is not as active in this respect as slaked lime. By using both slaked lime and calcium carbonate plant acids can be rapidly neutralized, without danger of over-liming with resultant undesirable alkalinity, such as might be injurious to certain vitamin values, like flavins or vitamin G complexes. In the example cited above the amount of slaked lime is considerably less than that required to completely neutralize plant acid, although the reagent mixture neutralizes to the desired extent. The calcium chloride content assists in hardening plant fibre, and its use also enables a reduction in the amount of lime without sacrificing the desired hardening effect.

It is generally known that enzymic activity is destructive to certain vitamin values. In dried alfalfa and like products enzymic activity is catalized or activated by the presence of colloidal iron and manganese and possibly other like metals or metallic compounds. The tannic acid content specified above serves the useful purpose of precipitating colloidal iron and manganese, and like substances present, thus minimizing or disrupting enzymic action. Tannic acid also serves the useful purpose of affording an anti-oxidant. As an example of related tannins which can be employed, reference can be made to pyrogallol.

It is desirable to employ the calcium lactate content in place of corresponding amounts of lime, because this salt serves as a buffer having an anti-enzymic action. It tends to more definitely fix the hydrogen ion concentration of the material, whereby the pH value of the final material is only slightly acid, and in the order of from pH 6.5 to 6.8. Some unreacted calcium lactate remains in the final material, to serve as a solid buffer as pointed out above. Presence of calcium lactate during processing also serves to prevent excessive action of the lime, and minimizes possible injury to carotene and vitamin G by virtue of the strong alkalinity of the lime.

The benzoic acid content referred to above serves as a preservative and anti-fermenting agent. Thus the product is made more immune to possible spoilage, even though it is freely subjected to the atmosphere or adverse climatic conditions during storage. In place of this particular substance I can make use of other preservatives like boric acid or salicyclic acid.

The amount of the reagent mixture used can be adjusted somewhat dependent upon the type of vegetable material being dehydrated. The amount which has given good results with ordinary alfalfa has been indicated above. The fineness with which the material is comminuted will depend upon the type of product desired. In general with my process it is possible to chop to a greater degree of fineness, than in prior processes, because of the facility with which the material can be dried. In preparing a stock feed I prefer to chop to a particle size of one-quarter inch or less.

The dehydrated product produced by my process appears much greener in color than products produced by other dehydrating processes. It has been kept over periods of several months, without material deterioration in color, carotene or vitamin content. I attribute the preservation of color to the minimum rate of oxidation of color components both during and after drying, and to some form of color stabilization taking place because of the reagents employed. This is in contrast with conventional dried alfalfa, which when exposed to daylight, largely loses its carotene content and green color in about five days. As will be evident from the foregoing the final product contains small amounts of residual solid phase calcium carbonate and calcium lactate, together with small amounts of tannic acid or related tannins and traces of benzoic acid or related benzoate compounds. All such compounds are homogeneously dispensed throughout the dried material. The final material has some residual moisture, such as from 6 to 15%.

It is frequently desirable to subject the product produced as described above, to further treatment to inhibit oxidation and in general to extend the period over which the product can be stored without serious deterioration. This can be accomplished by adding small amounts of a neutral mineral oil, as for example by atomizing thin mineral oil into the product, while the product is in suspension. The small amount of oil thus applied to the material serves as a sealing agent, thus protecting the material against oxidation. Deoxidants like hydroquinone, and oil soluble vitamin values like carotin, can be introduced into the oil, to fortify the vitamin content. One-half (½) to one (1) percent (by weight) of oil, will give good results.

I claim:

1. In a process for dehydrating fresh leafy vegetable material, like alfalfa or spinach, comminuting the fresh vegetable material and substantially neutralizing plant acids contained in the same, and then removing moisture to form an uncooked dehydrated product.

2. In a process for drying fresh leafy vegetable material, like alfalfa or spinach, comminuting the fresh vegetable material and treating the same to the action of a calcium compound, the calcium compound serving to substantially neutralize plant acids and to harden the fibre, and then removing moisture to form an uncooked dehydrated product while the material is in a state of continual agitation.

3. In a process for dehydrating fresh leafy vegetable material, like alfalfa or spinach, comminuting the fresh vegetable material and treating the same to the action of a neutralizing chemical and also to the action of a tannin, and then removing moisture to form a dehydrated product.

4. In a process for treating fresh leafy vegetable material, like alfalfa or spinach, comminuting the fresh vegetable material, treating the same to the action of chemical reagents, the reagents including a neutralizing substance capable of substantially neutralizing plant acids and also capable of hardening the plant fibre, and a tannin serving to precipitate colloidal metals, like iron and manganese, whereby enzymic activity is minimized, and removing moisture to form a dehydrated product.

5. In a process for treating fresh leafy vegetable material, like alfalfa or spinach, comminuting the fresh vegetable material, treating the same to the action of chemical reagents, the reagents including a neutralizer serving to substantially neutralize plant acids, and a buffer salt capable of maintaining the hydrogen ion concentration in the order of 6.5 to 6.8, and removing moisture to form a dehydrated product.

6. In a process for dehydrating fresh leafy vegetable material, like alfalfa or spinach, comminuting the fresh vegetable material, treating the same to the action of chemical reagents, the reagents including a neutralizer for substantially neutralizing plant acids and calcium lactate as a buffer salt, and then removing moisture to form a dehydrated product having a solid calcium lactate content.

7. In a process for dehydrating fresh leafy vegetable material like alfalfa or spinach, comminuting the fresh vegetable material and treating the same to the action of chemical reagents, the reagents including calcium hydroxide and calcium carbonate, and being capable of substantially neutralizing plant acids, and then removing moisture to form an uncooked dehydrated product.

8. In a process for dehydrating fresh leafy vegetable material, like alfalfa or spinach, comminuting the fresh vegetable material and treating the same to the action of chemical reagents, the reagents including a calcium compound capable of substantially neutralizing plant acids and also tannic acid, and then removing moisture to form a dehydrated product.

9. In a process for the treatment of fresh leafy vegetable material like alfalfa or spinach, comminuting the fresh vegetable material, treating the same to the action of chemical reagents, the reagents including calcium hydroxide, calcium carbonate, and tannic acid, the amount of calcium hydroxide and calcium carbonate being insufficient to afford a substantial alkalinity after neutralizing plant acid, and removing moisture to form a dehydrated product.

10. In a process for the treatment of fresh leafy vegetable material like alfalfa or spinach, comminuting the fresh vegetable material, treating the material with chemical reagents, the reagents including a mixture of calcium hydroxide, calcium chloride, calcium carbonate, tannic acid, and calcium lactate, and removing moisture to form a dehydrated product.

11. In a process for the treatment of fresh leafy vegetable material, like alfalfa or spinach, comminuting the fresh vegetable material, treating the same to the action of chemical reagents, the reagents including calcium hydroxide, and calcium lactate, and removing moisture to form a dehydrated product.

12. In a process for drying fresh leafy vegetable material like alfalfa or spinach, comminuting the fresh vegetable material, treating the same to the action of chemical reagents, the reagents including a neutralizer capable of substantially neutralizing plant acids, a tannin, a buffer salt capable of maintaining a pH value in the order of 6.5 to 6.8, and benzoic acid as a preservative, and removing moisture to form a dehydrated product.

13. In a process for dehydrating fresh leafy vegetable material, like alfalfa or spinach, comminuting the fresh vegetable material, treating the same to the action of a tannin and removing moisture to form an uncooked dehydrated product.

14. In a process for the manufacture of dried vegetable material like alfalfa, comminuting the fresh vegetable material, introducing a neutralizing reagent with the material to neutralize plant acids, removing moisture to form a dried uncooked material, and adding small amounts of mineral oil to the material to seal and protect the comminuted particles.

15. In a process for the manufacture of dried vegetable material like alfalfa, comminuting the fresh vegetable material, introducing a tannin into the material, removing moisture to form a dried uncooked material, and adding small amounts of mineral oil to the material to seal and protect the comminuted particles.

FAW YAP CHUCK.